US011958253B2

(12) United States Patent
Gherardi et al.

(10) Patent No.: US 11,958,253 B2
(45) Date of Patent: Apr. 16, 2024

(54) USE OF ISOSORBIDE

(71) Applicant: ELANTAS Europe S.R.L., Collecchio (IT)

(72) Inventors: Paola Gherardi, Wesel (DE); Daniela Menozzi, Wesel (DE); Fabio Campanini, Wesel (DE); Ettore Fazio, Wesel (DE)

(73) Assignee: ELANTAS Europe S.R.L., Collecchio (IT)

( * ) Notice: Subject to any disclaimer, the term of this patent is extended or adjusted under 35 U.S.C. 154(b) by 664 days.

(21) Appl. No.: 16/954,236

(22) PCT Filed: Dec. 20, 2018

(86) PCT No.: PCT/EP2018/086428
§ 371 (c)(1),
(2) Date: Jun. 16, 2020

(87) PCT Pub. No.: WO2019/122257
PCT Pub. Date: Jun. 27, 2019

(65) Prior Publication Data
US 2020/0307109 A1   Oct. 1, 2020

(30) Foreign Application Priority Data
Dec. 21, 2017 (EP) ..................... 17209572

(51) Int. Cl.
| B29C 64/40 | (2017.01) |
| B29C 39/00 | (2006.01) |
| B29C 39/02 | (2006.01) |
| B29C 39/36 | (2006.01) |
| B33Y 10/00 | (2015.01) |
| B33Y 30/00 | (2015.01) |
| B33Y 70/00 | (2020.01) |
| C08G 59/24 | (2006.01) |
| C08G 59/26 | (2006.01) |
| C08G 59/50 | (2006.01) |
| C08G 65/26 | (2006.01) |
| C08J 9/00  | (2006.01) |
| C08K 7/28  | (2006.01) |

(52) U.S. Cl.
CPC ............ B29C 64/40 (2017.08); B29C 39/003 (2013.01); B29C 39/36 (2013.01); B33Y 70/00 (2014.12); C08G 59/26 (2013.01); C08G 59/5026 (2013.01); C08G 65/2621 (2013.01); C08J 9/0023 (2013.01); C08J 9/0061 (2013.01); B29C 39/02 (2013.01); B29K 2005/00 (2013.01); B33Y 10/00 (2014.12); B33Y 30/00 (2014.12); C08G 59/24 (2013.01); *C08J 2363/00* (2013.01); *C08J 2483/04* (2013.01); *C08K 7/28* (2013.01)

(58) Field of Classification Search
CPC ....... C08G 59/26; B29C 64/40; B29C 39/003; B29C 39/36; B29C 39/02; B29C 33/52; B33Y 70/00
See application file for complete search history.

(56) References Cited

U.S. PATENT DOCUMENTS

| 6,325,958 B1 * | 12/2001 | Lombardi ............... C04B 26/10 |
| | | 524/808 |
| 6,340,509 B1 * | 1/2002 | Nelson ................... B62K 19/16 |
| | | 280/281.1 |
| 7,619,056 B2 | 11/2009 | East et al. |
| 9,580,441 B2 | 2/2017 | Jin et al. |
| 9,581,924 B2 | 2/2017 | Veregin et al. |
| 9,605,108 B2 | 3/2017 | Hammond et al. |
| 9,644,059 B2 | 5/2017 | Palmese et al. |
| 10,174,152 B2 | 1/2019 | Buffe et al. |
| 10,751,951 B1 * | 8/2020 | Nguyen ................. B22F 7/062 |
| 2006/0154485 A1 | 7/2006 | Li |
| 2012/0092426 A1 | 4/2012 | Chopra et al. |
| 2015/0010697 A1 * | 1/2015 | Soncini .................... H01B 3/40 |
| | | 427/116 |
| 2015/0307650 A1 * | 10/2015 | Hammond ........... C08G 59/027 |
| | | 528/96 |
| 2015/0353673 A1 * | 12/2015 | Shiraki .................. C08G 59/26 |
| | | 528/93 |
| 2017/0002132 A1 | 1/2017 | Buffe et al. |
| 2017/0253692 A1 | 9/2017 | Lee et al. |

(Continued)

FOREIGN PATENT DOCUMENTS

| CN | 104250256 | 12/2014 |
| WO | 2014114534 A1 | 7/2014 |

(Continued)

OTHER PUBLICATIONS

"Sugar-Based Chemicals for Environmentally Sustainable Applications" Xianhong Feng, Anthony J. East, Willis Hammond, and Michael Jaffe, Contemporary Science of Polymeric Materials. Jan. 1, 2010 , 3-27 DOI:10.1021/bk-2010-1061.ch001 (Year: 2010).*

(Continued)

*Primary Examiner* — Michael M. Robinson
*Assistant Examiner* — Inja Song
(74) *Attorney, Agent, or Firm* — Fitch, Even, Tabin & Flannery LLP

(57) ABSTRACT

The present invention relates to the use of a composition comprising isosorbide diglycidyl ether and a curing agent as a sacrificial support, to a sacrificial support comprising isosorbide repeating units, to methods for producing the sacrificial support of the invention and to uses of the sacrificial support of the invention for producing three-dimensional objects.

16 Claims, No Drawings

(56) References Cited

U.S. PATENT DOCUMENTS

2018/0009160 A1* 1/2018 Sawada ................ B29C 64/106
2018/0036940 A1* 2/2018 Fleischhaker .......... B33Y 40/20
2020/0123308 A1* 4/2020 Buffe ................... C09D 163/00

FOREIGN PATENT DOCUMENTS

WO  2015110758 A1  7/2015
WO  2016140906 A1  9/2016

OTHER PUBLICATIONS

International Search Report and Written Opinion for International Application No. PCT/EP2018/086428 dated Mar. 14, 2019 (10 pages).

* cited by examiner

USE OF ISOSORBIDE

The present invention relates to the use of a composition comprising isosorbide diglycidyl ether and a curing agent as a sacrificial support, to a sacrificial support comprising isosorbide repeating units, to methods for producing the sacrificial support of the invention and to uses of the sacrificial support of the invention for producing three-dimensional objects.

BACKGROUND OF THE INVENTION

The production of three-dimensional objects having complicated structures, presents a unique manufacturing challenge especially if holes or cavities have to be created in the object.

A sacrificial support or sacrificial core is used in the production of three-dimensional objects for creating special forms and eventually as filler when a hole has to be created. Accordingly, the aim of such a sacrificial support is to determine the shape of a three-dimensional object during its processing but then it has to be separated from the final object without damaging it. For this reason, the sacrificial core must have good thermal and mechanical stability, at least to guarantee the processing of the three-dimensional object, and it shall be easily removed. In some cases sacrificial supports can be easily removed because of the part's design geometry, but any configuration that traps a core or mandrel inside it requires a special, often sacrificial, tooling form.

The current state of the art includes different options of sacrificial supports. Examples thereof are extractable cores, soluble cores, two-piece layups, layups within a closed clamshell mold, clamshell molds combined with extractable cores. Extractable cores and closed clamshell molds present severe geometry limits, they can be chosen only if there is an easy access to the cavity, while two-piece layups needs an additional bonding process that leaves a seam on the final composite part, with the risk to weaken the final object.

Sacrificial cores are the most promising approach for the construction of hollow geometries with undercuts. They can usually be made of eutectic salt, ceramic materials, urethanes, memory bladders and thermoplastic materials, but they require additional tooling and instrumentation, they can be difficult to handle and they need to operate preferentially in specific temperature ranges, often below 125° C. If they can resist to higher temperature it means that they need to be removed in harsh conditions.

Accordingly, it would be desirable to have materials to be used as sacrificial supports which are easily removable and at the same time resist to high temperature, e.g. to temperatures higher than 100° C.

Epoxy resins based on bisphenol A represent 75% of all industrially used epoxy resins and are well known in the art for their good mechanical and thermal properties. Due to the biotoxicity of bisphenol A, there is the tendency to substitute it in epoxy systems.

Moreover, the increased demand together with a limited supply of petroleum-based polymers has pushed the research to explore bio-based and thus renewable feedstocks. A lot has already been done in the area of thermoplastic, while for bio-based thermosetting resins very few products have been reported.

It would be desirable to have a material having comparable properties to the epoxy resins based on bisphenol A, for example, which could be also easily removable if used as sacrificial support.

In sum, there is a need to investigate and find new materials, which can be used as sacrificial support in the production of three-dimensional objects.

These problems are solved by the sacrificial supports of the invention.

The composition of the invention used for producing sacrificial support comprises isosorbide dig lycidyl ether and a curing agent.

Isosorbide has the advantage that it is derived from renewable resources from cereal-based polysaccharides and thus completely bioavailable.

Thanks to its particular chemical structure, isosorbide and its derivatives show affinity for water-based environments.

Through the curing of isosorbide diglycidyl ether, thermal and mechanical properties can be optimized.

All the characteristics of isosorbide and its derivatives can be surprisingly combined and be used in a sacrificial support and in a composition used for producing the sacrificial support of the invention.

In fact, the composition of the invention used for producing a sacrificial support allows to obtain sacrificial supports having comparable mechanical and thermal properties of a corresponding bisphenol A based epoxy resin with a better water solubility. Moreover, the gentle conditions to completely solubilize the sacrificial support of the invention allow to separate the sacrificial support from the final three-dimensional product without damaging it.

Within the meaning of the invention, the terms dissolve, disgregate and soluble when referred to a sacrificial support have the same meaning and it means that the sacrificial support in the presence of the solution used according to the invention, becomes a part of the solution.

In a first embodiment, the invention relates to the use of a composition comprising isosorbide diglycidyl ether and a curing agent for producing a sacrificial support.

In a preferred embodiment, the invention relates to the use of a composition comprising isosorbide diglycidyl ether and a curing agent for producing a sacrificial support, wherein the sacrificial support is for producing a three-dimensional object.

Preferably, the three-dimensional object is a polymeric three-dimensional object.

In a preferred embodiment, the composition of the invention comprises isosorbide diglycidyl ether.

In another embodiment, the composition of the invention may comprise one or more additional curing agent(s). Preferably, the composition of the invention may comprise 1 to 8 curing agents, more preferably, 1 to 7, more preferably 1 to 6, more preferably 1 to 5, more preferably 1 to 4, more preferably 1 to 3, more preferably 1 or 2, more preferably, one additional curing agent.

The curing agent of the composition of the invention and the additional curing agent can be the same or different.

In a further preferred embodiment, the curing agent of the composition of the invention has at least one amine-functional group having at least one active hydrogen linked to an amine nitrogen. More preferably, the curing agent has two amine functional groups each having at least one active hydrogen linked to an amine nitrogen.

Preferred curing agents of the composition of the invention is selected from the same group or from different groups consisting of aliphatic amines, cycloaliphatic amines, heterocyclic amines, aromatic amines, polyetheramines, polyaminoamides and the adducts thereof with epoxy groups containing compounds. More preferably poly(propylene glycol) bis(2-aminopropyl ether) with different molecular weights, trimethylolpropane tris[poly(propylene glycol), amine terminated] ether, 2(1-piperazinyl)ethylamine, 3-aminomethyl-3,5,5-trimethylcyclohexylamine, 3,6,9,12-tetraazatetradecane-1,14-diamine, tetraethylenepentamine and triethylenetetramine, 3,6-diazoctanethylenediamine, 3,6,9-triazaundecamethylenediamine, 1,3-bis(aminomethyl)benzene, 1,3-bis(aminomethyl)cyclohexane, 5-diethyl toluene-2,4-diamine and 3,5-diethyl toluene-2,6-diamine (mixture of the two isomers), 2,2'-(ethylenedioxy)bis(ethylamine), 1,6-diamino-2,2,4(2,4,4)-trimethylhexane, N'-(3-aminopropyl)-N,N-dimethylpropane-1,3-diamine, 4,4'-diaminodicyclohexylmethane, 1,2-cyclohexanediamine and mixtures thereof.

Further preferred curing agents can be selected from the group consisting of the previously cited amines partially reacted with epoxy derivatives in excess of amines to introduce an OH functionality in the structure to control vapour pressure, reactivity and final properties also known as adducts. Preferably adducts are not cross linked.

In a preferred embodiment, the composition of the invention further comprises a catalyst.

Catalysts to accelerate the reaction can also be used as hardeners alone or together with the previous mentioned curing agents. In one embodiment they are selected from tertiary amines or its salts. Preferably, catalysts are selected from the group consisting of benzyldimethylamine, 2,4,6-tris(dimethylaminomethyl)phenol, their salts with 2-ethylhexanoic acid, dimethylbenzyl amine, 2,4,6-tris(dimethylaminomethyl)phenol, tri 2-ethylhexanoate of 2,4,6-tris(dimethylaminomethyl)phenol, 1-methylimidazole, 2-cyanoguanidine and mixtures thereof.

In a preferred embodiment, the composition of the invention further comprises a catalyst for UV curing process.

Catalysts for UV curing can be used as curing agent in a photochemical reaction of polymerization initiated by ultraviolet light and/or visible light, preferably the one or more catalysts for UV curing are used alone, i.e., not in combination with other previously mentioned curing agents, especially not in combination with curing agents selected from amine derivatives. In one embodiment they are selected from onium compound salts. Preferred UV-curing catalysts of the composition of the invention are organic compounds comprising salts selected from the groups consisting of sulfonium salts and iodonium salts. Preferably, UV-curing catalysts of the composition of the invention are aryl sulfonium salts, aryl iodonium salts, aryl thioxanthene derivatives and mixtures thereof.

In a preferred embodiment, the sacrificial support can be produced using three-dimensional printing using the composition of the invention comprising isosorbide diglycidyl ether and a curing agent, wherein the curing agent is a catalyst for UV curing.

Further preferred curing agents can be selected from the group of anhydrides if longer disgregation time and harsher removing conditions of the sacrificial support are acceptable. Anhydride can be preferably selected from the group consisting of methyl-5-norbornene-2,3-dicarboxylic anhydride, 4-methyl-1,2-cyclohexanedicarboxylic anhydride (mixtures of cis and trans), dodecenylsuccinic anhydride (mixtures of isomers), tetrahydrophthalic anhydride, tetrahydromethylphthalic anhydride, hexahydrophthalic anhydride and mixtures thereof, alone or together with catalysts such as Lewis bases or acids, tertiary amines such as benzyldimethylamine, dimethylaminomethylphenol, tris(dimethylaminomethyl)phenol, boron trihalide amine complexes, stannic chloride, ammonium salts, phosphonium salts, and substituted imidazoles.

Within the meaning of the invention adduct means curing agents, having at least an active hydrogen amine functional group, reacted with compounds having at least one epoxy group in such a way that the adduct has at least one active hydrogen amine functionality and the adduct is not cross-linked. Within the meaning of the invention, curing agents and hardeners have the same meaning and are in principle any of those known in the art for the curing of epoxies.

In one embodiment, the curing agents are used in a stoichiometric ratio, with respect to the epoxy groups present in the isosorbide resin. This means that the ratio of the amount of the epoxy groups in the composition and the amount of the active hydrogen linked to an amine nitrogen of the amine functional group are 100 to 100.

In another embodiment, the ratio of the amount of the epoxy groups in the composition and the amount of the active hydrogen linked to an amine nitrogen of the amine functional group are 100 to 120, preferably of 100 to 110, more preferably of 100 to 105.

In another embodiment, the ratio of the amount of the epoxy groups in the composition and the amount of the active hydrogen linked to an amine nitrogen of the amine functional group are 120 to 100, preferably of 110 to 100, more preferably of 105 to 100.

In another embodiment, the composition of the invention may comprise one or more reactive diluents. Preferably, the reactive diluent is selected from the group consisting of monofunctional epoxy diluents including cresyl glycidylether, various alkyl glycidylethers, bifunctional epoxy diluents including butanediol diglycidylether, hexanediol diglycidylether, neopentylglycol diglycidylether, polypropylene glycol diglycidylether, multifunctional epoxy diluents including trimethylolpropane triglycidylether, epoxydized castor oil, epoxydized soy bean oil and mixtures thereof.

In another embodiment, the composition of the invention further comprises at least one inorganic filler. Preferred inorganic fillers are selected from the group consisting of carbonates, alumina hydrates, silico-alluminates, hollow glass microspheres, quartz, sericite mica, chlorite and mixtures thereof. More preferred inorganic filler is fillite.

In another embodiment, the composition of the invention further comprises at least one organic filler.

Preferred organic fillers are selected from the group consisting of phenolic resins, acrylic resins and mixtures thereof, thermoplastic-based systems to enhance toughness or water/solubility can be selected from the group of poly(vinyl alcohol), poly(vinyl acetate), ethylene-vinyl acetate, rubber and mixtures thereof. More specifically, the preferred organic fillers are selected from the group consisting of poly(vinyl alcohol) based polymers.

In another embodiment, the composition of the invention further comprises additives. According to the instant invention, they can be selected from the group consisting of air release, wetting agents, defoamers and mixtures thereof, antifoaming agent, dispersant aids, rheological antisettling agents and pigments.

In another embodiment of the invention, the composition further comprises at least one antifoaming agent.

Preferred antifoaming agent(s) is selected from at least one acrylic copolymer or silicone based defoamers or mixtures thereof.

In another embodiment of the invention, the composition could further comprise one or more dispersant aids, rheological antisettling agents and pigments.

In another embodiment, the composition used for producing the sacrificial core of the invention consists of isosorbide diglycidyl ether, one or more curing agent, an inorganic filler, an organic filler and an antifoaming agent.

In another embodiment, the composition of the invention comprises isosorbide diglycidyl ether, one or more curing agent, an inorganic filler and an antifoaming agent.

In a preferred embodiment, the composition of the invention comprises:
(a) 55 to 85 weight % of isosorbide diglycidyl ether;
(b) 10 to 30 weight % of curing agent;
(c) 0 to 15 weight % of additives;

Wherein the weight % is based on the sum of the components (a), (b) and (c) and it does not include organic fillers, inorganic fillers and catalyst.

In another embodiment, the invention relates to a sacrificial support for producing a three-dimensional object comprising a polymer having isosorbide ether repeating units.

In a preferred embodiment of the invention, the polymer having isosorbide ether repeating units further comprises amine groups.

In another preferred embodiment, the polymer having isosorbide ether repeating units has a Tg between 50 and 180° C., preferably between 50 and 180° C., preferably between 70 and 150° C., more preferably between 70 and 130, most preferably between 70 and 110° C., measured via differential scanning calorimetry in ramp of 10° C./min according to ASTM D 3418. Preferably, the value of the Tg is the one obtained in the first measurement or scan.

In another embodiment, the invention relates to a process for producing a sacrificial support for producing a three-dimensional object, wherein the sacrificial support comprises a polymer having isosorbide ether repeating units, comprising the steps of
a) providing a composition comprising isosorbide diglycidyl ether and a curing agent;
b) casting the composition in a mould;
c) at least partially curing the composition;
d) separating the at least partially cured composition from the mould to obtain the sacrificial support.

In a preferred embodiment of the invention, the process of the invention comprises a further step e) of modifying the shape of the sacrificial support after separating it from the mould. Preferably, the modification is performed by cutting or by mechanical abrasion of the sacrificial support.

Alternatively, the process for producing the sacrificial support can be performed using a three-dimensional printing apparatus by providing a composition comprising isosorbide diglycidyl ether and a curing agent, wherein the curing agent is a catalyst for UV curing.

In one embodiment, the composition is partially cured in the mold and further cured after separation of the partially cured composition from the mould. Preferably, the further curing step is performed in an oven.

In another embodiment inserts made of polymeric material, such as polyethylene, polypropylene, Teflon, polyamides and the like, can be used to create holes and cavities within the sacrificial core. The presence of these cavities allows a better solubility or disgregation of the sacrificial increasing the surface of contact between the solution and the sacrificial support and also reduces the amount of sacrificial support material needed for the sacrificial support.

In a preferred embodiment, the composition of the invention further comprises foaming agents.

Foaming agents can be used to create holes and cavities within the sacrificial core producing a cellular structure via a foaming process. Preferred foaming agents of the composition of the invention are selected from the groups of polysilane, silicone hybride, polysiloxanes, silicones derivatives and mixtures thereof. More preferably, polysiloxanes, most preferably polymethylhydrosiloxane. Furthermore, surfactants can be used to improve the cellular structure inside the sacrificial core during the foaming process. Preferably, surfactants of the composition of the invention are selected from the groups of silicone glycols, polysiloxanes and mixtures thereof.

Within the meaning of the invention silicone hybride means: polyethers, polyurethanes, acrylic, aliphatic and aromatic chains with at least one silyl or siloxane or hydroxysiloxane functional group.

Accordingly, the process of the invention optionally comprises the step of separating an insert from the sacrificial support.

In a preferred embodiment of the invention, the curing step c) of the process for producing a sacrificial support for producing a three-dimensional object is performed for a time comprised between 2 and 30 hours, preferably between 2 and 26 hours, preferably between 2 and 24 hours, preferably between 2 and 20 hours, preferably between 2 and 16 hours, preferably between 2 and 12 hours, preferably between 2 and 8 hours, preferably between 2 and 6 hours, preferably between 2 and 4 hours.

In another preferred embodiment of the invention, the curing step c) of the process for producing a sacrificial support for producing a three-dimensional object is performed at a temperature comprised between 23 and 180° C., preferably, between 40 and 180° C., preferably between 60 and 130° C.

In another preferred embodiment of the invention, the curing step c) of the process for producing a sacrificial support for producing a three-dimensional object is performed at a temperature between 40 and 180° C. and for 2 to 16 hours.

In a further preferred embodiment, the curing step c) of the process for producing a sacrificial support for producing a three-dimensional object is performed in two cycles, at the same or different temperature and at the same or different curing time in each cycle.

In another embodiment, the invention relates to the use of a composition comprising isosorbide diglycidyl ether and a curing agent for producing a sacrificial support further comprising the use of the sacrificial support in a process for preparing a three-dimensional object.

In another embodiment, the invention relates to a process for preparing a three-dimensional object comprising the steps of
a) producing a sacrificial support according to the process of the invention;
b) depositing a material at least partially covering the sacrificial support, wherein the material comprises a polymer; and
c) removing the sacrificial support from the deposited material to obtain the three dimensional object.

In another embodiment, before depositing the material in step b) a standard liquid, paste or solid release agent is put onto the surface of the sacrificial support. The release agent facilitates the separation of the at least partially cured composition from the deposited material.

Alternatively, the process for producing in step a) of the process for producing a three-dimensional object the sacrificial support is produced using a composition comprising isosorbide diglycidyl ether and a curing agent, wherein the curing agent is a catalyst for UV curing, in a three-dimensional printing apparatus.

In a preferred embodiment, the removing step of the sacrificial support in the process for preparing a three-dimensional object is performed using either water, or an aqueous basic solution, or an aqueous acidic solution. Preferably, the removing step of the sacrificial support is performed using an aqueous acidic solution. More preferably, the aqueous acidic solution is an acetic acid solution or a vinegar solution.

In a preferred embodiment, the acid solution has a pH comprised in the range of 1-5, more preferably 3-4.

Within the meaning of the invention, at least partially covering the sacrificial support means that the surface of the sacrificial support can be covered only partially or completely by the deposited material. When the surface of the sacrificial support is partially covered, the sacrificial support can be removed starting from its free surface. When the surface of the sacrificial core is completely covered by the deposited material, the three dimensional object is mechanically processed, e.g. drilling a hole or cutting the three-dimensional object in a desired form allowing separation of the sacrificial core from the three dimensional object.

In another preferred embodiment, the material used in step b) of the process for preparing a three-dimensional object comprises a curable polymer, which is cured before step c).

Preferably, the curable polymer is selected from thermoplastic or thermosetting polymers.

More specifically, the preferred thermoplastic polymers are selected from the group consisting of polyethylene, polypropylene, polyethylenterephtalate, acrylonitrile-butadiene-styrene, nylon, polycarbonate, polyvinylchloride.

More specifically, the preferred thermosetting are selected from the group consisting of epoxy, polyester, polyurethanes, phenolic, polyaminoamides, polyamideimide and silicones based resins.

In another preferred embodiment, the material used in step b) of the process for preparing a three-dimensional object is a composite material obtained with all known technologies like RTM, autoclave, stratification, infusion, pultrusion, filament winding.

In another preferred embodiment, the three-dimensional object is made of a composite material.

In a preferred embodiment, the invention relates to the use of the sacrificial support for producing a three-dimensional object of anyone of the embodiments described herein in the manufacture of composite materials.

Preferably, the fibers used in the composite material are carbon fibers, glass fibers, natural or synthetic fibers. Most preferred are carbon fibers.

Sacrificial core, sacrificial support, sacrificial support material and specimen have the same meaning and indicate the material used to give a form, e.g. hollow, to a three dimensional object and this sacrificial support material has to be eliminated or separated from the three dimensional object.

The material deposited in step b) of the process for producing a three-dimensional object may comprise one or more layer or coating(s), which may have the same meaning. The layer or coating used in the invention can be made of carbon and or glass fibers woven or non-woven veils pre-impregnated with a polymeric substance belonging to the family of epoxy or polyester resins either hot-melt or in solvent mixtures. The layers are deposited on the sacrificial support, assuming its removable tooling for hollow, complex and trapped geometry in composite part production, and cured in autoclave with curing cycle from 80° C. to 180° C. from 2 to 16 hours with 3-8 bar pressure.

The sacrificial support according to the invention preferably has flexural strength in the range of 80 and 160 MPa, preferably in the range of 115 and 120 MPa, measured at 25° C.

The sacrificial support according to the invention preferably has maximum strain calculated on the flexural properties in the range of 2% and 6%, preferably in the range of 3.5% and 5.0%, measured at 25° C.

The sacrificial support according to the invention preferably has strain at break calculated on the flexural properties in the range of 5% and 12%, preferably in the range of 8.5 and 9.5%, measured at 25° C.

The sacrificial support according to the invention preferably has flexural elastic modulus in the range of 2500 and 5500 MPa, preferably in the range of 3500 and 4500 MPa, measured at 25° C.

The sacrificial support according to the invention preferably has tensile strength in the range of 50 and 100 MPa, preferably in the range of 75 and 85 MPa, measured at 25° C.

The sacrificial support according to the invention preferably has a maximum strain calculated on tensile properties in the range of 3% and 10%, preferably in the range of 6% and 7%, measured at 25° C.

The sacrificial support according to the invention preferably has strain at break calculated on tensile properties or elongation at break in the range of 3.5 and 10.5%, preferably in the range of 6.5 and 7.5%, measured at 25° C.

The present invention is explained in more details by the following Examples.

Within the meaning of the invention r.t. means room temperature and it is meant to be 23° C.

EXAMPLES

Example 1—Comparative Example

Curable Reference Epoxy Composition

An epoxy formulation containing 34.2% by weight of liquid bisphenol A based epoxy resin with a number average molecolar weight ≤700 g/mol, 40.9% liquid bisphenol F based epoxy resin with a number average molecolar weight ≤700 g/mol, 24.2 wg. % of 1,6-bis(2,3-epoxypropoxy) hexane and 0.7 wg. % of Airex 900 as antifoaming agent was formulated, homogeneized and degassed.

A hardener formulation comprising 50.7 wg. % of poly (propylene glycol) bis(2-aminopropyl ether) with a number average molecular weight of 230 g/mol, 34.1 by weight of 2-(1-piperazinyl)ethylamine, 8.2% by weight of 3-aminomethyl-3,5,5-trimethylcyclohexylamine and 7% by weight of 4,4'-isopropylidenediphenol was prepared, homogeneized and degassed.

100 parts by weight of the epoxy formulation were mixed with 33 parts by weight of the hardener formulation.

The system was cured 15 hours at 60° C.

Example 2

100 parts by weight of a commercially available liquid isosorbide diglycidyl ether having an epoxide equivalent weight of 165 was mixed with 34 parts by weight of the formulated hardener having the same composition as the hardener formulation of Example 1.

The system was cured 15 hours at 60° C.

Table 1 summarizes the viscosity and reactivity behavior of the composition of comparative Example 1 based on bisphenol A epoxy resin and the composition using the same curing agents of Example 1 but using isosorbide diglycidyl ether epoxy instead of bisphenol A. The initial mixture viscosity refers to the viscosity of the two mixed components measured by a Brookfield viscosimeter at 40° C., with a 21 spindle moving at 10 RPM. Gelation time was measured following UNI 8701. Pot life and exothermic peak refer to the following test: 100 mL of the system are cured at 23±2° C. while measuring the thermal excursion with a temperature probe immersed in the system and connected to a recording system. Pot life is the time that the system needs to reach 40° C., while exothermic peak is the maximum temperature achieved during curing.

Table 2 shows the mechanical and thermal properties of the cured compositions of comparative Example 1 and of Example 2 according to the invention. Glass transition temperature was measured via differential scanning calorimetry following ASTM D 3418; tensile properties were performed accordingly to ASTM D 638; flexural properties were measured accordingly to ASTM D 790.

TABLE 1

| Property | Conditions | Comparative Example 1 | Example 2 |
|---|---|---|---|
| Initial mixture viscosity (mPa · s) | 40° C. | 100 | 100 |
| Pot life, doubled initial viscosity | 40° C. | 20'5 | 8'5 |
| Gelation time (min) | 25° C., 100 mL | 32'8 | 12'4 |
| Pot life (min) | 25° C., 100 mL | 25 | 9 |
| Exothermic peak (° C.) | | 176 | 159 |

TABLE 2

| Property | Conditions | Comparative Example 1 | Example 2 |
|---|---|---|---|
| Glass transition (° C.) 1$^{st}$/2$^{nd}$ scan | Ramp 10° C./min | 70/64 | 58/56 |
| Flexural strength (MPa) | 25° C. | 111 ± 1.4 | 120 ± 1.4 |
| Flexural Maximum strain (%) | | 5.2 ± 0.1 | 4.2 ± 0.1 |
| Flexural Strain at break (%) | | 9.3 ± 0.9 | 8.8 ± 0.7 |
| Flexural elastic modulus (MPa) | | 3'150 ± 80 | 3'980 ± 75 |
| Tensile strength (MPa) | | 77 ± 1.8 | 82 ± 1.8 |
| Tensile Maximum strain (%) | | 8.0 ± 1.4 | 6.8 ± 1.1 |
| Tensile Strain at break (%) | | 9.3 ± 1.3 | 7.1 ± 1.2 |

As stated above, the composition of Example 2 was obtained using the same ingredients with respect to the composition of Example 1 except that the bisphenol A of the epoxy element was substituted by isosorbide.

The results on the mechanical and thermal analysis of the two compositions summarized in Tables 1 and 2 revealed that the properties necessary for obtaining a support material, which can be used for the production of three-dimensional objects are maintained.

Example 3

100 parts by weight of liquid isosorbide diglycidyl ether having an epoxide equivalent weight of 165 was mixed with 18 parts by weight of 3,6,9,12-tetraazatetradecane-1,14-diamine (hardener) and cured 15 hours at 60° C.

The Tg of 75° C., measured via differential scanning calorimetry (DSC model 25 T.A. Instruments, ASTM D 3418) indicated full curing.

Example 4

100 parts by weight of liquid isosorbide diglycidyl ether having an epoxide equivalent of 165 was mixed with 21 parts by weight of 1,3-bis(aminomethyl)benzene and cured 15 hours at 60° C.

The Tg of 74° C., measured via differential scanning calorimetry (ASTM D 3418) indicated full curing.

Example 5

100 parts by weight of liquid isosorbide diglycidyl ether having an epoxide equivalent weight of 165 was mixed with 28 parts of 3-aminomethyl-3,5,5-trimethylcyclohexylamine (hardener) and cured 3 hours at 100° C. in order to reach the maximum Tg.

The Tg of 98° C., measured via differential scanning calorimetry (ASTM D 3418) indicated full curing.

Water Absorption Test

The water absorption tests were performed following ASTM D 570. Six specimens having a diameter of 50.8 mm±0.3 mm and a thickness of 3.2 mm±0.3 mm were cast for each Example and cured 15 hours at 60° C. 3 specimens for each system were immersed in water at room temperature (23±2° C.) for 24 hours, while the 3 remaining were immersed in hot boiling water for 2 hours. The weight of the specimens was recorded before and after the test. The percentages shown in Table 3 represent the weight variation after the test. A positive value means that the specimen increased its weight. "Disgregated" means that the specimen broke up during the test.

TABLE 3

| | Water absorption (%) | | | | |
|---|---|---|---|---|---|
| Conditions | Comparative Example 1 | Example 2 | Example 3 | Example 4 | Example 5 |
| 2 h at 100° C. | +2.1-2.3 | +24.2-24.7* | disgregated | +16.0-16.5* | +9.2-9.7 |
| 24 h at RT | +0.3-0.5 | disgregated | disgregated | disgregated | +7.2-7.7 |

*Specimens become soft and flexible after the test

Table 3 summarizes the water absorption percentages of comparative Example 1 and of Examples 2 to 5 according to the invention.

As clearly shown in this Table, Examples 2 to 5 either disgregate or increase substantially their weight when immersed in water.

The data shown in Table 3 clearly demonstrate that the compositions of the invention are extremely affected by the presence of an aqueous environment. All the Examples showed water diffusion inside the matrix that led either to a breaking or a swelling of the specimens. This property can be exploited in the formulation of a specific isosorbide-based organic matrix for the preparation of sacrificial cores that can be dissolved in water or in aqueous-based solutions.

Example 6

An epoxy formulation containing 59.3% by weight of liquid isosorbide diglycidyl ether having an epoxide equivalent weight of 165, 40% by weight of fillite, 0.7% by weight of Airex 900 as antifoaming agent was formulated, homogeneized and degassed. Diethyl methyl toluene diamine as a mixture of the two major isomers 3,5-diethyl toluene-2,4-diamine and 3,5-diethyl toluene-2,6-diamine was used as curing agent. 100 parts by weight of isosorbide formulation were mixed with 17 parts by weight of the curing agent and carefully degassed.

The system was cured 2 hours at 120° C. and 2 hours at 175° C.

The Tg of 108° C., measured via differential scanning calorimetry (ASTM D 3418) indicated full curing.

Example 7

Sacrificial Support Preparation and Dissolution Test

The composition of Example 6 was cast in a cylindrical mould in order to obtain a specimen of 50 mm height×29 mm diameter for the solubility test. The composition in the mould was cured 2 hours at 120° C. and 2 hours at 175° C. The Tg of 108° C., measured via differential scanning calorimetry (ASTM D 3418) indicated full curing.

Dissolution Test

For the dissolution test, the cylindrical specimen was immersed in a 5% by weight acetic acid solution in water stored at room temperature (23±2° C.). The sacrificial support showed complete disgregation/dissolution of the organic matrix during 72 hours.

Example 8

Curable Isosorbide Composition for Dissolution Tests

An epoxy formulation containing 59.3% by weight of liquid isosorbide diglycidyl ether having an epoxide equivalent weight of 165, 40% by weight of fillite, 0.7% by weight of Airex 900 as antifoaming agent was prepared, homogeneized and degassed. 3-aminomethyl-3,5,5-trimethylcyclohexylamine was used as curing agent. 100 parts by weight of isosorbide formulation were mixed with 17 parts by weight of the curing agent and carefully degassed. The system was cured 3 h at 40° C. and 2 h at 100° C. The Tg of 87° C., measured via differential scanning calorimetry (ASTM D 3418) indicated full curing.

Example 9

Sacrificial Support Preparation

The composition of Example 8 was casted in a cylindrical mould in order to obtain a specimen of 50 mm height×29 mm diameter. The composition in the mould was cured 3 h at 40° C. and 2 h at 100° C. The Tg of 87° C., measured via differential scanning calorimetry (ASTM D 3418) indicated full curing. After separation of the obtained specimen from the mould, the sacrificial support was then subjected to the deposition of the carbon pre-preg layers and submitted to a curing cycle of 130° C. for 120 minutes and with 6 bar pressure after vacuum bagging.

Dissolution Test

To remove the inner sacrificial support, the carbon composite with the sacrificial support inside was immersed in a 5% by weight acetic acid solution in water. After 48-72 hours, the sacrificial core was completely disgregated/dissolved.

The composite material was isolated without any damages as it can be seen in Table 4, where the properties of the composite material before and after acidic treatment are summarized. In fact, the mechanical properties of the carbon composite were unaltered after the immersion in the solution.

Composite Mechanical Properties Testing

In order to evaluate the effect of the acidic solution on the carbon composite, specimens for Interlaminar Shear Strength (ILSS, ASTM D 2344) were prepared and immersed in the acidic solution for 72 h.

TABLE 4

| Property | Conditions | | Composite specimen |
|---|---|---|---|
| ILSS short beam strength (MPa) | 25° C. | Pristine | 32.4 ± 1.2 |
| | | After acidic treatment (72 hours immersion) | 32.2 ± 0.9 |

Example 10

An epoxy formulation containing 77.9% by weight of liquid isosorbide diglycidyl ether having an epoxide equivalent weight of 165, 18.8% by weight of hollow glass microspheres, 3.2% of calcium carbonate stearate, 0.1% by weight of Airex 900 as antifoaming agent, was prepared, homogeneized and degassed. 3-aminomethyl-3,5,5-trimethylcyclohexylamine was used as curing agent. 100 parts by weight of isosorbide formulation were mixed with 22 parts by weight of the curing agent and carefully degassed.

Sacrificial Support Preparation

The composition of Example 10 was cast in a mould in order to obtain a machinable block with a length of 460 mm, a width of 120 mm and a thickness of 5 mm. The composition in the mould was cured 24 hours at r.t. and postcured 2 h at 100° C. The Tg of 75° C., measured via differential scanning calorimetry (ASTM D 3418) indicated full curing. After separation of the obtained specimen from the mould, the machinable block was submitted to a milling process in order to evaluate the machinability of the system. An excellent machinability was achieved.

Dissolution Test

To evaluate the dissolution properties of the machinable block, a parallelepiped of 21*37*35 mm was cut from the main block and immersed in 200 mL of a 5% by weight acetic acid solution in water. By changing the solution every 8-12 hours, the sacrificial core was completely disgregated/dissolved after 28-36 hours.

Example 11

Foamed Sacrificial Support Preparation

An epoxy formulation containing 77.5% by weight of liquid isosorbide diglycidyl ether having an epoxide equivalent weight of 165, 18.8% by weight of hollow glass microspheres, 3.2% of calcium carbonate stearate, 0.5% by weight of silicone glycol as blowing agent, was prepared, homogeneized and degassed. A hardener formulation comprising 50% of 1,2-cyclohexanediamine and 50% of the two isomers of 5-diethyl toluene-2,4-diamine and 3,5-diethyl toluene-2,6-diamine was used as curing agent. A polymethylhydrosiloxane was used as blowing agent. 100 parts by weight of isosorbide formulation were mixed with 16 parts by weight of the curing agent and 0.7 part by weight of the blowing agent.

The composition of Example 11 was cast in a mould in order to obtain a machinable block with a length of 200 mm, a width of 200 mm and a thickness of 2.4 mm. The composition in the mould was cured 8 hours at 80° C. and postcured 6 h at 130° C. The Tg of 108° C., measured via differential scanning calorimetry (ASTM D 3418) indicated full curing. After separation of the obtained specimen from the mould, the machinable block was submitted to a milling process in order to evaluate the machinability of the system. An excellent machinability was achieved.

Dissolution Test

To evaluate the dissolution properties of the machinable block, a parallelepiped of 175*125*24 mm was cut from the main block and immersed in 5 L of vinegar. By manual removing the superficial eroded parts of the core every 4-8 hours, the sacrificial support was completely disgregated/dissolved after 18-20 hours.

The invention claimed is:

1. A process for preparing a three-dimensional object, the process comprising:
   producing a sacrificial support comprising a polymer including isosorbide ether repeating units and not comprising a bisphenol A based epoxy resin, the sacrificial support being produced by a process comprising:
      providing a composition comprising isosorbide diglycidyl ether and a curing agent,
      casting the composition in a mould,
      at least partially curing the composition, and
      separating the cured composition from the mould to obtain the sacrificial support;
   depositing a material to at least partially cover the sacrificial support, wherein the material comprises a polymer; and
   removing the sacrificial support from the deposited material to obtain the three-dimensional object.

2. The process of claim 1, wherein the curing agent has at least one amine functional group having at least one active hydrogen linked to an amine nitrogen.

3. The process of claim 1, wherein the curing agent has two amine functional groups each having at least one active hydrogen linked to an amine nitrogen.

4. The process of claim 1, wherein the composition further comprises at least one organic filler.

5. The process of claim 4, wherein the at least one organic filler includes one or more of a phenolic resin, an acrylic resin, poly(vinyl alcohol), polyvinyl acetate), ethylene-vinyl acetate, and rubber.

6. The process of claim 1, wherein the composition further comprises at least one foaming agent.

7. The process of claim 6, wherein the at least one foaming agent includes one or more of a polysiloxane, polymethylhydrosiloxane, silicone hybride, and a silicone derivative.

8. The process of claim 1, wherein the polymer including the isosorbide ether repeating units further comprises amine groups.

9. The process of claim 1, wherein the sacrificial support has a Tg between 50 and 180° C., measured via differential scanning calorimetry according to ASTM D 3418.

10. The process of claim 1, wherein the sacrificial support has elongation at break in the range of 3.5 and 10.5% measured at 25° C. according to ASTM D 638.

11. The process of claim 1, wherein the curing is performed for a time in the range of 2 to 30 hours.

12. The process of claim 1, wherein removing the sacrificial support from the deposited material comprises contacting the sacrificial support with an aqueous acidic solution.

13. The process of claim 1, wherein the deposited material comprises a curable polymer, and the process further comprises curing the curable polymer before removing the sacrificial support from the deposited material.

14. The process of claim 1, wherein the deposited material comprises a composite material.

15. The process of claim 1, wherein the curing agent comprises one or more of a poly(propylene glycol) bis(2-aminopropyl ether), trimethylolpropane tris [poly(propylene glycol), amine terminated] ether, 2(1-piperazinyl)ethylamine, 3,6,9,12-tetraazatetradecane-1,14-diamine, tetraethylenepentamine, 3,6-diazoctanethylenediamine, 3,6,9-triazaundecamethylenediamine, 1,3-bis(aminomethyl)benzene, 1,3-bis(aminomethyl)cyclohexane, a mixture of 5-diethyl toluene-2,4-diamine and 3,5-diethyl toluene-2,6-diamine, 2,2'-(ethylenedioxy) bis(ethylamine), 1,6-diamino-2,2,4(2,4,4)-trimethylhexane, N'-(3-aminopropyl)-N,N-dimethylpropane-1,3-diamine, and 4,4'-diaminodicyclohexylmethane.

16. A process for preparing a three-dimensional object, the process comprising:
   producing a sacrificial support comprising a polymer including isosorbide ether repeating units and not comprising a bisphenol A based epoxy resin, the sacrificial support being produced by a three-dimensional printing process using a composition comprising isosorbide diglycidyl ether and a curing agent;
   depositing a material to at least partially cover the sacrificial support, wherein the material comprises a polymer; and
   removing the sacrificial support from the deposited material to obtain the three-dimensional object.

* * * * *